United States Patent [19]

Mouchot et al.

[11] Patent Number: 4,940,972
[45] Date of Patent: Jul. 10, 1990

[54] METHOD OF REPRESENTING A PERSPECTIVE IMAGE OF A TERRAIN AND A SYSTEM FOR IMPLEMENTING SAME

[75] Inventors: Carine Mouchot, Conflans Ste Honorine; Gérard Frappier, Paris, both of France

[73] Assignee: Societe d'Applications Generales d'Electricite et de Mecanique (S A G E M), Paris Cedex, France

[21] Appl. No.: 154,576

[22] Filed: Feb. 10, 1988

[30] Foreign Application Priority Data

Feb. 10, 1987 [FR] France ............................ 87 01607

[51] Int. Cl.$^5$ ............................................. G09G 1/14
[52] U.S. Cl. ................................... 340/747; 364/522
[58] Field of Search ............... 340/700, 705, 720, 747, 340/812, 980; 358/75, 104; 434/38, 43; 353/10–12; 364/518, 521, 522

[56] References Cited

U.S. PATENT DOCUMENTS

| | | | |
|---|---|---|---|
| 4,055,004 | 10/1977 | Chase | 434/43 |
| 4,177,579 | 12/1979 | Peters et al. | 358/104 |
| 4,384,338 | 5/1983 | Bennett | 364/522 |
| 4,489,389 | 12/1984 | Beckwith et al. | 364/522 |
| 4,520,506 | 5/1985 | Chan et al. | 340/812 |
| 4,583,185 | 4/1986 | Heartz | 340/700 |
| 4,645,459 | 2/1987 | Graf et al. | 434/38 |
| 4,667,190 | 5/1987 | Fant | 340/747 |
| 4,682,160 | 7/1987 | Beckwith, Jr. et al. | 340/747 |
| 4,685,068 | 8/1987 | Greco, II et al. | 358/75 |
| 4,715,005 | 12/1987 | Heartz | 340/720 |

FOREIGN PATENT DOCUMENTS 2524177 3/1982 France .
2113056 7/1983 United Kingdom .

OTHER PUBLICATIONS

R. Herbelin et al, "Airborne Electronic Terrain Map System—Conclusions", IEEE 1984 National Aerospace and Electronics Conference, May 1984.

Primary Examiner—Gerald Brigance
Assistant Examiner—Richard A. Hjerpe
Attorney, Agent, or Firm—Lowe, Price, LeBlanc, Becker & Shur

[57] ABSTRACT

A method is provided for representing, on a display device screen and in perspective from a given point of observation, the image of a terrain known by the nodes of a given mesh network, in which for each image pixel, the point of intersection is determined of the line which starts from the point of observation and which passes through this image pixel with a surface passing through the nodes and taking on approximately the shape of the ground, and said image pixel is illuminated with the color of the pixel associated with a digitized planimetric map or photograph of the ground.

11 Claims, 8 Drawing Sheets

METHOD OF REPRESENTING A PERSPECTIVE IMAGE OF A TERRAIN AND A SYSTEM FOR IMPLEMENTING SAME

BACKGROUND OF THE INVENTION

1. Field of the invention

The present invention relates first of all to a method of representing, on a given flat support (i.e display device) and in perspective from a given point of observation, the image of a ground terrain known by the coordinates of the nodes of a given mesh network, in which a surface passing through these nodes is determined by interpolation. An assembly of points on the surface is determined and the pixels of the image to be represented, which are associated with this assembly of points, are illuminated so as to display the image on the display device screen.

The invention applies in particular to the presentation, to the pilot of an aircraft, of a synthetic image of the ground terrain over which he is flying or, to the driver of a land vehicle, of a synthetic image of the site in which he is travelling, whatever the conditions of visibility. The invention also makes possible the presentation of images of real or fictitious sites for the purposes of simulation.

In the case of assisting piloting and navigational tasks, the coordinates of the nodes of the mesh network are stored in a memory filled from a data base available for example from the National Geographical Institute. Such a data base contains the altitude of nodes obtained by sampling the terrain every three seconds of an arc, in latitude and in longitude, i.e. about 65 m in latitude and 92 m in longitude for the French territory. The point of observation, as well as the flat support on which the image is represented, depend on the position of the aircraft with respect to the ground, as well as its attitude so that, for example, the image represented corresponds as well as possible to what the pilot may see from his cabin under good conditions of visibility. A processing circuit, connected to the memory storing the coordinates of the nodes of the network and receiving the data from the instruments measuring the position and attitude of the aircraft, then determines the image pixels to be illuminated and consequently controls a display device disposed in front of the pilot.

2. Description of the Prior Art

A method of the above defined type is already known, described in French patent application No. 2 524 177. In this method, the surface determined by interpolation and passing through the nodes includes a set of triangular facets which takes on then approximately the shape of the ground, and the assembly of points of this surface with which the illuminated image pixels will be associated includes the nodes of an auxiliary mesh network, different from the preceding mesh network and depending here on the point of observation. This auxiliary mesh network is projected on a horizontal plane in a set of concentric circles centered on the projection, on the same horizontal plane of the point of observation and in a set of straight lines passing through this projection. In other words, the projection of the auxiliary network on a horizontal plane forms a sort of spider's web centered on the projection of the point of observation. The evenness of this projection of the auxiliary network means that the representation of the nodes of this auxiliary network obtained, by illuminating the image pixels which are associated therewith gives an image of the relief of the facet surface so of the ground to be represented.

However, although this method makes it possible to display the relief of the ground, it gives little information about the corresponding site, to the extent that it does not allow either the type of vegetation covering the ground to be represented, or the communication means such as rivers, roads and railways, nor the built up areas for example.

To overcome this drawback, methods are known making possible the synthetic representation of relatively realistic landscapes, in which trees, constructions and superstructures appear in relief, further shown, like the ground, in colors so as to improve the readability thereof. These methods have however the drawback of being very unwieldly to use, for they require modelling of the whole of the landscape using colored facets, which, at the present time, can only be done manually and by a qualified operator. Furthermore when this costly modelling has been made, storage thereof occupies considerable room in the memory, which limits its application to small ground surfaces.

The invention overcomes the above drawbacks by providing a method of the above defined type, making possible the presentation of relatively complete information while remaining fairly simple to implement automatically, without manual intervention.

SUMMARY OF THE INVENTION

The invention provides then a method of the above defined type, wherein a planimetric map or photograph of the ground is defined with color information, the map is digitized so as to obtain map pixels of given colors, the points of said assembly of points being defined so that they are all associated respectively with all the pixels of the image, with each of all these points, and so with each of the image pixels, a map pixel is associated and each image pixel is illuminated in the color of the associated map pixel.

In the method of the invention, on the perspective image of the ground is superimposed a digitized planimetric map of this ground. By planimetric map is meant here a conventional type map, such as a road map or an ordnance survey map, but also an aerial photograph or a satellite view at vertical incidence. Such digitized maps are available for example from the National Geographical Institute. Naturally, the word "color" is to be interpreted here in the wide sense, i.e. corresponding either to a multicolor representation or to a representation of black and white type, comprising a scale of grey levels.

In the case where a conventional type map is used, a perspective representation is then obtained of the ground, clothed with information to be found on the map, namely the types of vegetation, the course of the rivers, the lay out of the roads, the built up areas and also the names of these rivers, roads and built up areas, the departmental boundaries and frontiers for example.

In the case where a plan is used on which road or rail communication projects or others appear, the future integration of these projected constructions in the site are simulated in perspective.

In the case where an aerial photograph is used, obtained from an aircraft or a satellite, the corresponding landscape is displayed in a realistic manner and in perspective.

In other words, we may say that a relief plot is obtained of the two dimensional image formed by the planimetric map, which improves at the same time its readability and that of the relief.

Advantageously, the displayed pixels of the flat suport which are not pixels of the image of the ground are illuminated in a color representing the sky.

Advantageously also, the point of said assembly of points, associated with an image pixel, is the first point of intersection of said surface with the line which extends from the point of observation and which passes through this image pixel.

In this case, the hidden parts of the ground, i.e. the parts not visible from the point of observation, are eliminated.

Also advantageously, the map pixel associated with a point of said assembly of points is the map pixel having the same planimetric coordinates as this point.

The present invention also provides a system for implementing the above method for representing, on a given flat support and in perspective from a given point of observation, the image of a ground terrain known by the coordinates of the nodes of a given mesh network, including:

a first memory for storing the coordinates of said nodes, means for generating a signal of data representative of the point of observation and of the flat support, means connected to said first memory and to said generation means for determining by interpolation a surface passing through said nodes, then an assembly of points on this surface, and the pixels of the image to be represented which are associated with this assembly of points, and display means connected to said determination means for illuminating said pixels of the image to be represented, in which system a second memory is provided for storing a planimetric map, or photograph, of the ground, with color information, digitized in the form of map pixels of given colors, said determination means are connected to said second memory and adapted so as to define the points of said assembly so that they are all respectively associated with all the pixels of the image, for associating with each of these points, so with each of the image pixels, a map pixel and so as to illuminate each image pixel in the color of the associated map pixel.

BRIEF DESCRIPTION OF THE DRAWINGS

The file of this patent contains three color photographs. Copies of this patent with color photographs will be provided by the Patent and Trademark Office upon request and payment of the necessary fee.

The present invention will be better understood from the following description of the preferred embodiment of the method of the invention, as well as embodiments of the system of the invention with reference to the accompanying drawings in which.

DETAILED DESCRIPTION OF THE PREFERRED EMBODIMENTS

Figure 1:
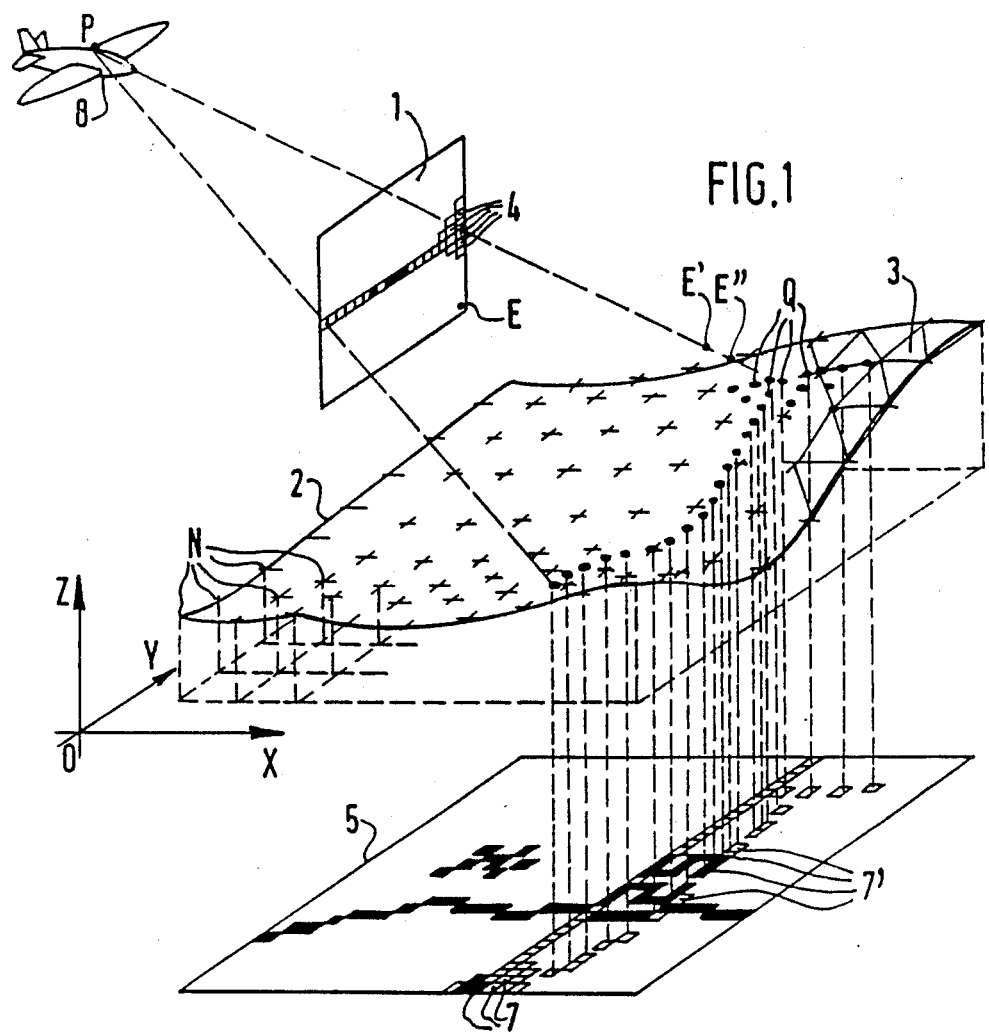
FIG. 1 shows schematically ground over which an aircraft is flying, this ground being associated with a digitized map.

Referring to FIG. 1, a method for the synthetic representation of a piece of ground 2, for the pilot of an aircraft 8 flying over this ground is described by way of example.

The point of observation is point P and a flat support 1, here rectangular, represents for example the window of the cabin of the aircraft, through which the ground 2 over which the aircraft flies can be seen, if the conditions of visibility are good. In FIG. 1, and for obvious reasons of clarity, the flat support 1 is considerably enlarged. The synthetic representation method supplied proposes supplying the observer with a synthetic perspective image of the ground flown over comparable to the true image, but independent of the conditions of visibility. This synthetic image produced from information relating to ground 2 is stored in a memory, and information coming from instruments on board the aircraft concerning the position and attitude of the aircraft 8 with respect to ground 2, is presented to the observer in a known way, for example by means of a screen of the same size as the flat support 1 or of a different size, or else by means of a known device for superimposition of the real image.

The information concerning the ground 2 stored in the memory comprises on the one hand altimetric height information and on the other planimetric information, these two types of information being supplied here and for the French territory by the National Geographical Institute.

The altimetric information includes the coordinates of nodes N of a mesh network obtained by sampling the ground every 3 seconds of an arc, i.e., and as was mentioned above, about 65 m in latitude and about 95 m in longitude. For each of these nodes, in a trirectangular reference frame OX, OY, OZ related to the ground, the coordinate of latitude X, the coordinate of longitude Y and the coordinate of altitude Z are known.

Figure 2:
FIG. 2 shows a detailed view of the digitized map of FIG. 1.

The planimetric information includes a map 5 of the ground, with color information, representing here and by way of example the type of vegetation, the course of the rivers, the lay out of the roads, and the built up areas as well as the names of these rivers, roads and built up areas, and other indications of this type. Map 5 is digitized, i.e. it has been divided into a plurality of elementary areas or image elements, or pixels, such as pixels 7 and 7' in FIG. 1. The size of these pixels is chosen fairly small, in a way known per se, so that to each of them may be assigned a uniform color, chosen from a finite set of quantified colors, without appreciable loss of information. Such maps are available from the National Geographical Institute. FIG. 2, which is a photograph of a cathode screen, gives one example of a digitized map, showing in particular roads and built up areas. Naturally, such a map may be readily stored since it is entirely defined by the knowledge of the planimetric coordinates, i.e of the latitude X and of the longitude Y, and of the quantified color of each of the map pixels.

Because the altitude of ground 2 is only known for nodes N and since, as will be seen further on, it will be useful to know this altitude for certain points which do not necessarily coincide with nodes N, a known surface 3 is determined everywhere approximately matching the shape of ground 2. For that, and in a way known per se, a surface 3 is defined by interpolation from the coordinates of nodes N. In FIG. 1, the surface 3 has been shown obtained by replacing each ground portion between three nodes by a flat triangular face. There naturally exist other types of interpolation which will be described hereafter, after a first general description of the method.

After defining the type of interpolation adopted, for each pixel 4 of the flat support 1 which belongs to the image of ground 2 the point Q of surface 3 which is associated with this pixel 4 and which is represented by this pixel 4 may be determined, i.e. the first point of intersection Q of this surface 3 with the line which extends from point P and passes through pixel 4. The procedure for determining point Q will be described hereafter.

The planimetric coordinates X and Y of this point Q allow the pixel 7' of map 5 to be determined which is associated with this point Q of surface 3, i.e. in practice of ground 2.

Figure 3:
FIG. 3 shows a view of the synthetic representation, in perspective, of the ground of FIG. 1, obtained by means of the method of the invention.
Figure 4:
FIG. 4 shows the synthetic perspective representation of the relief alone of the ground of FIG. 1.

As can be seen in FIG. 1, a horizontal line, for example, of image pixels 4 corresponds to a succession of points Q on surface 3 which draws a tortuous curve in space. This tortuous curve is obviously not projected on map 5 along a straight line, but along any curve. The result is that, by illuminating each image pixel 4 in the color of the map pixel 7' which is associated therewith, a deformed representation of map 5 is obtained, as if this map were drawn on the surface 3 itself instead of being drawn on a plane; the assembly is thus shown in perspective. FIG. 3, which is a photograph of a cathode screen, shows the result obtained from the map of FIG. 2 and altimetric information of the corresponding ground. In FIG. 3, which shows the deformation of the roads and of the built up areas of FIG. 2, it can be seen that map 5 and the perspective image of ground 2 have been superimposed. In FIG. 3, in order to further improve the readability of the image obtained, each image pixel 4 has been illuminated in the color of the associated map pixel 7', with an intensity which depends on the lighting of ground 2, in the vicinity of point Q associated with this image pixel 4, i.e. of the point Q which this image pixel 4 represents. For this, a direction of lighting the ground is chosen, for example which coincides with that of the sun, and the lighting is calculated in the vicinity of each point Q. This technique, known in the case where a uniform color is assigned to the surface 3 represented, and described in greater detail hereafter, makes it possible to restore good readability to the relief, as shown in FIG. 4 in this case. FIG. 4, still a photograph of a cathode screen, shows a "dune" effect which in fact represents the results obtained in the case of representing the relief alone of the ground portion shown in FIG. 3. Naturally, this modulation of the light intensity of each pixel, although it greatly improves the readability of the image obtained, is not always obligatory. For example, in the case where the map used is an aerial photograph, it generally includes natural shading, which is sufficient to give an idea of the relief. This relief also appears because some portions of the map will not be represented, since some portions of the surface and of the ground are hidden. In fact, since with each image pixel there is associated a first point of intersection Q of surface 3 with the line which extends from point P and which passes through pixel 4, i.e. the point of intersection the closest to point P, the portions of the surface 3 not visible from point P are not represented.

Naturally, when the line which leaves from point P and which passes through a pixel of the support plane 1 does not intercept surface 3, or intercepts it at a distance greater than a threshold defining the horizon, it is considered that this pixel is not an image pixel 4 and it is illuminated with a color representing the sky, for example, the color blue. This may occur if the radius passes above the horizon line or if the stored data, not only altimetric but also planimetric, only relates to a portion of the ground which is in the field of vision defined by point P and the flat support 1.

Figure 5:
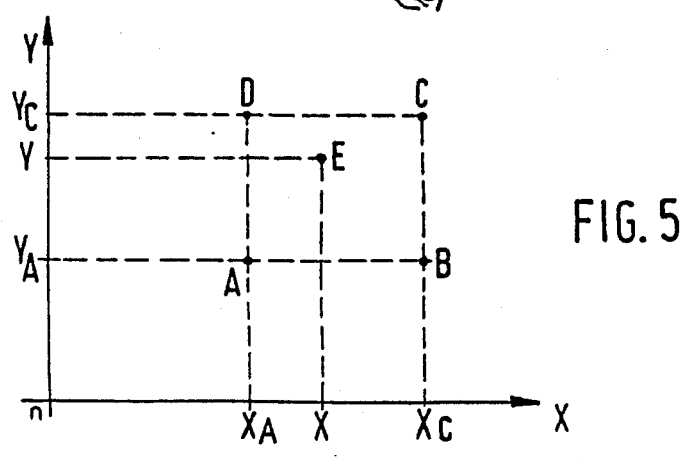
FIG. 5 is a diagram illustrating the interpolation processes which may be used in the method of the invention.

Referring to FIG. 5, different examples are described for determining surface 3 by interpolation. In the Figure, point E represents a point of the planimetric coordinates X and Y, whose altitude Z is to be determined, knowing that it is in the mesh of the mesh network defined by the four nodes A, B, C, D of coordinates $(X_A, Y_A, Z_A)$, $(X_C, Y_A, Z_B)$, $(X_C, Y_C, Z_C)$, and $(X_A, Y_C, Z_D)$, respectively.

A first fairly rough type of interpolation consists in assigning to point E the altitude Z of the nearest node, here node D:

$$Z = Z_D$$

In this case, ground 2 is likened to a surface 3 formed of horizontal rectangles, of an area equal to that of the mesh, and centered on each node.

A second type of interpolation is interpolation by facets, shown in FIG. 1, which is tantamount to assigning to point E an altitude Z dependent on the altitudes of the three nearest nodes, here nodes A, D and C, in accordance with the following formula, bilinear along X and Y:

$$Z = \frac{(Y - Y_C)}{(Y_A - Y_C)} Z_A + \left[\frac{(X_A - X)}{(X_C - X_A)} + \frac{(Y - Y_A)}{(Y_C - Y_A)}\right] Z_D + \frac{(X - X_A)}{(X_C - X_A)} Z_C$$

A third type of interpolation is interpolation by non flat surfaces projected in mesh ABCD, which is tantamount to assigning to point E an altitude of the four nodes A, B, C, D of the mesh, in accordance with the following formula, also bilinear along X and Y:

$$Z = \frac{(X - X_C)(Y - Y_C)}{(X_A - X_C)(Y_A - Y_C)} Z_A + \frac{(X - X_A)(Y - Y_C)}{(X_C - X_A)(Y_A - Y_C)} Z_B +$$
$$\frac{(X - X_A)(Y - Y_A)}{(X_C - X_A)(Y_C - Y_A)} Z_C + \frac{(X - X_C)(Y - Y_A)}{(X_A - X_C)(Y_C - Y_A)} Z_D$$

The three preceding types of interpolation, as well as others, are well known to a man skilled in the art, whose is able to choose the one which seems to him the best adapted, taking into account the compromise to be made between the interpolation accuracy and the complexity of the calculations which result therefrom.

When the type of interpolation defining surface 3 to which ground 2 is likened has been defined, the intersection point Q associated with each pixel of the flat support 1, i.e. with each screen pixel, is calculated in the following way.

The flat support 1 is broken down into a matrix of pixels which correspond to the pixels of the screen by means of which the image will be displayed. This is done column by column, beginning each time with the lowest pixel in the column, which is generally the one which is the closest to surface 3 and for which it is almost certain to find a point of intersection Q with surface 3.

For the lowest pixel of a column, point E is used, situated on the line which will leave from point P and passes through this pixel, and whose position is varied.

Initially, this point E is on the flat support 1. Thus, it is certain that point E is above surface 3. After choosing a pitch D for progression along the line, the distance PE is increased step by step, observing each time the relative position of point E with respect to surface 3. As soon as point E is below surface 3, the point of intersection is sought by the known dichotomy method, i.e. the distance PE is reduced by D/2, then by D/4, and so on, i.e. by steps of a value each time equal to half that of the preceding step, until point E passes above surface 3. Then the distance PE is again increased in steps of a value each time equal to half that of the preceding step, i.e. by $D/2^{n+1}$, $D/2^{n+2}$, and so on, if the value $D/2^n$ was that which caused point E to pass above surface 3. This is continued, for example, as far as an increase in distance equal to $D/2^p$, which causes point E to pass below surface 3, and so on.

As is known, if we stop when the distance variation between two successive points E is less than a given threshold, for example $D/2^N$ and if we call E' the last point E obtained, we are certain that the distance between E' and the point of intersection Q is less than the threshold. By choosing N fairly large, we can then assign to point Q the coordinates of point E' without appreciable error.

As a general rule, since it is a question of the lowest pixel, in the column, a point of intersection Q is found at a finite distance. If no point of intersection is found whereas the distance PE exceeds a threshold corresponding substantially to the horizon, it is considered that the pixel is not a pixel 4 of the image of ground 2 and it is illuminated with the color of the sky, as well as the following pixels in the column.

If, as is generally the case, the point of intersection Q is found at a finite distance, the pixel considered belongs to the image of ground 2, and it is illuminated in the color of pixel 7' of map 5 which is associated therewith, that is to say of pixel 7' having the same planimetric coordinates X and Y as the point of intersection Q.

We then pass to the next pixel of the column, for which the point of intersection Q is sought of surface 3 with the line which leaves from point P and which passes through this pixel by proceeding substantially as for the lowest pixel, except that, on the one hand, we start from a point E' whose initial distance to the flat support 1, instead of being zero is equal to the distance PQ found for the preceding pixel and, on the other hand, the pitch of progressing along the radius is chosen equal to D', with D' less than D. Since, as a general rule the points Q associated with two adjacent image pixels 4 are not very distant from each other, there is thus a saving in calculating time.

In order to improve the readability of the image obtained, each image pixel 4 may be illuminated with variable intensity, depending on the point Q of the ground with which it is associated, and which it represents.

By way of example the light intensity of the image pixel 4 may be made to depend on the distance PQ, so that this intensity is all the lower the greater the distance PQ. A law inversely proportional to the square of the distance is very suitable.

The light intensity may also be made to depend on the altitude of point Q, represented, so that this intensity is all the lower the higher the altitude, or else by processing this altitude by discontinuous levels, so as to cause contours to appear.

It is also possible, as was mentioned and shown in FIGS. 3 and 4, to define a lighting direction by means of a standardized vector, and to cause the light intensity to depend on the lighting of point Q, represented. For this, the normal to surface 3 at Q is calculated, possibly by means of a known type of approximation method, and the scalar product of the normal and of the lighting vector is worked out. This scalar product depends on the angle between the two vectors. The light intensity depends on the modulus of the scalar product if this latter is negative, and if this product is positive, the light intensity is zero for, although point Q is seen from the point of observation P, it is not lit by the lighting source. It will moreover be noted that in the method used the problem of eliminating the hidden parts from the image represented, i.e. the parts which are not seen from the point of observation P, does not arise to the extent that the first point of intersection Q is chosen on the line coming from point P.

Figure 6:
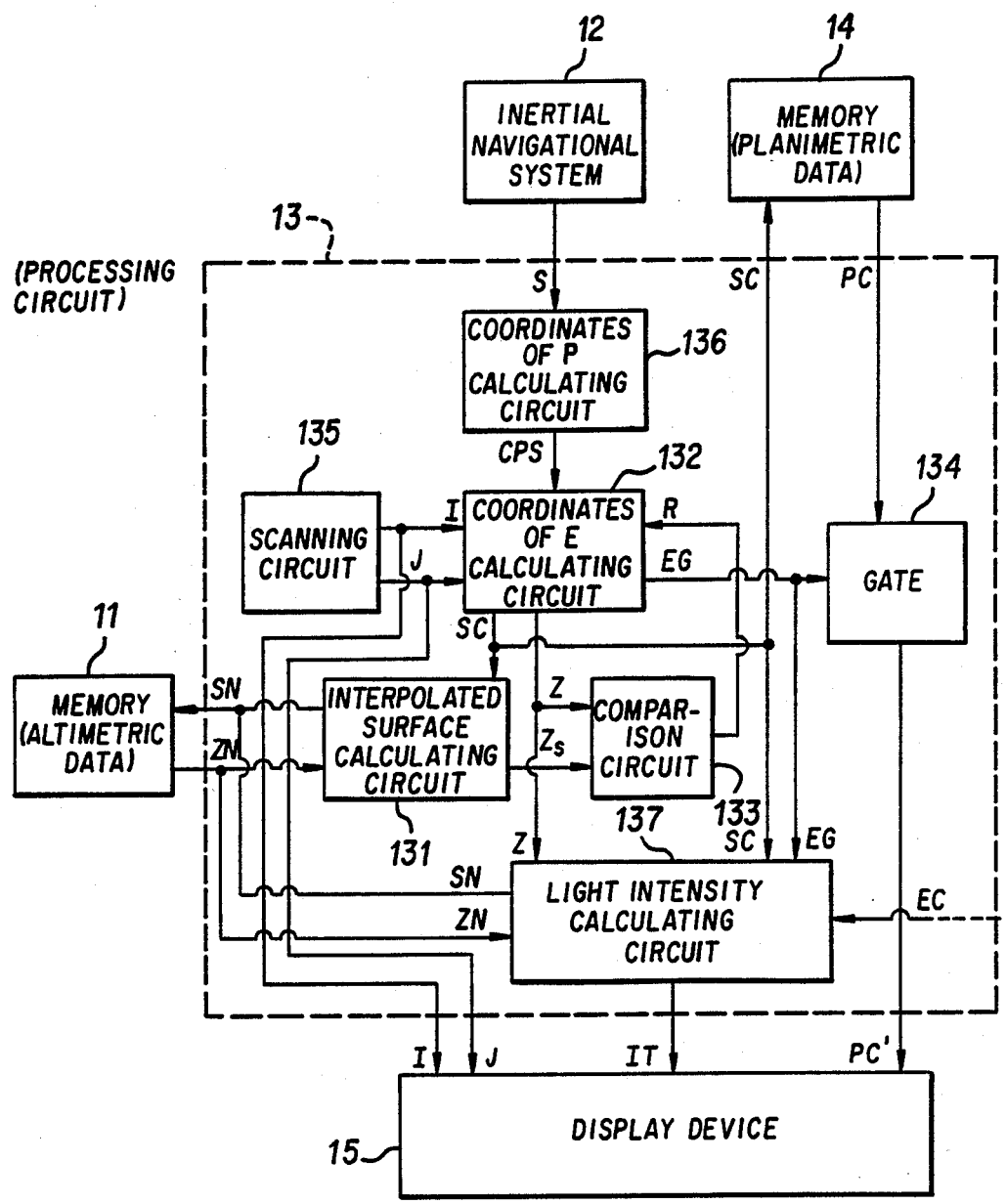
FIG. 6 is a schematical block representation of a system for implementing the method of the invention.

The method which has just been described is implemented for example with the system shown in FIG. 6.

This system comprises mainly a processing circuit 13, connected to two memories 11 and 14 and to the inertial navigational system 12 of aircraft 8, and controlling a display device 15.

The inertial navigational system 12 of the aircraft is of known type which delivers a data signal S representative of the position of the aircraft and its attitude, so of the point of intersection P and of the flat support 1.

Memory 11 contains altimetric data relating to the ground 2 over which the aircraft is flying. It has an input receiving an addressing signal SN and an output delivering a signal ZN. The addressing signal SN represents the coordinates X and Y of a node N of the mesh network and the output signals ZN represents the altitude Z of this node N.

Memory 14 contains the planimetric data of the ground 2 over which the aircraft is flying, i.e. the digitized map 5. It has an input receiving an addressing signal SC and an output delivering a signal PC. The addressing signal SC represents the coordinates X and Y of a map pixel 7 and the output signal PC represents the color of this map pixel 7.

The display device 15 is of known type having a screen, for example a cathode screen, organized in a pixel matrix, including four inputs receiving the signals I, J, IT and PC' corresponding respectively to the line, the column, the light intensity and the color of the pixel to be illuminated.

The processing circuit 13 is adapted so as to determine by interpolation surface 3 then each point Q of this surface P associated with each image pixel 4, i.e. each point of intersection Q of surface 3 with the line which leaves from point P and which passes through this image pixel 4, finally each map pixel 7' associated with each point Q, so with each image pixel 4.

The processing circuit 13 includes a circuit 136 which, in response to the signal S, calculates in the reference frame related to the ground OX, OY, OZ, the coordinates of point P and of support 1. It delivers a data signal CPS.

A scanning circuit 135 delivers the signals I and J so as to control scanning of the screen of the display device 15, column by column, beginning in each column by the lowest pixel.

A circuit 132 calculates, in response to signal CPS and signals I and J, the coordinates of point E or of point E', situated on the line leaving from P and passing through the pixel defined by the signals I and J. Circuit 132 delivers two signals SC and Z, the first representative of the planimetric coordinates X and Y and the second of the altitude Z of point E, or of point E'.

A circuit 131 for calculating surface 3 by interpolation, connected to the memory 11 with which it exchanges the signals SN and ZN, receives the signal SC and delivers a signal ZS which represents the altitude of the point of surface 3 having the planimetric coordinates X and Y of point E, or of point E'.

A comparison circuit 133, receiving signals Z and ZS, compares their values. It is provided with an output delivering a binary signal R. The signal R is at the high level when Z is greater than ZS, i.e. when point E, or point E', is above the surface 3. It then controls the calculating circuit 132 so as to cause point E, or point E' to advance along the line that is to say to increase the distance PE. Signal R is at the low level when Z is less than ZS, i.e. when point E, or point E', is below the surface S. It then controls the calculating circuit 132 so as to cause point E, or point E' to move back along the line, i.e. to reduce the distance PE.

Circuit 132 is adapted so as to work out the above described dichotomy and when the distance between two successive points is less than the above defined threshold $D/2^N$, it delivers a binary signal EG for controlling a gate circuit 134 which applies to the display device the signal PC' identical to signal PC representing the color of the map pixel 7' whose planimetric coordinates X and Y are defined by the signal SC, i.e. which are those of the point of intersection Q.

Thus, we may say that the gate circuit 134 causes a map pixel 7' to be associated with each point of intersection Q.

Similarly, we may say that the calculating circuit 132 and the comparison circuit 133 associate with an image pixel 4 the point of intersection Q of surface 3 with the line which passes through this image pixel 4.

Circuit 137 here calculates the light intensity with which the pixel defined by signals I and J must be illuminated so as to take into account the lighting of surface 3, that is to say ground 2. For this, it receives signals SC, Z and EG so as to have available the coordinates of the point of intersection Q and it is connected to memory 11 with which it exchanges the signals SN and ZN for calculating the normal at Q to surface 3. From the lighting direction defined by an external signal EC and which the operator may modify, it calculates the light intensity to be assigned to the pixel as was described above.

Naturally the processing circuit 13 may also be formed by a single calculating circuit which accomplishes the tasks of circuits 131 to 137 sequentially. By way of example FIGS. 7, 8 and 9 are a flow chart illustrating the operation of such a circuit.

Figure 7:
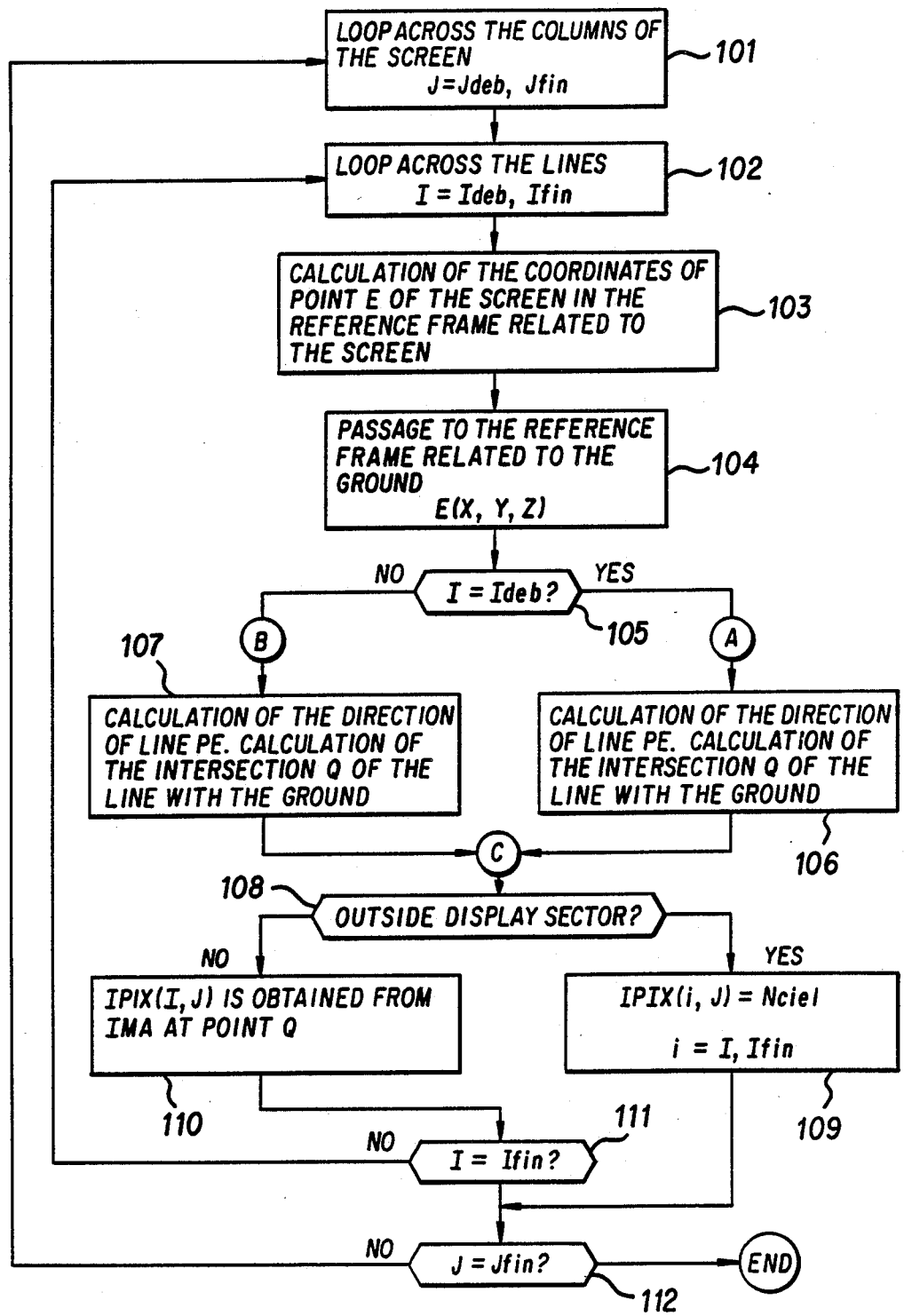
FIG. 7 is a flow chart of a program for performing the method of the invention.

In FIG. 7 blocks 101 to 105 call for no particular comments.

Figure 8:
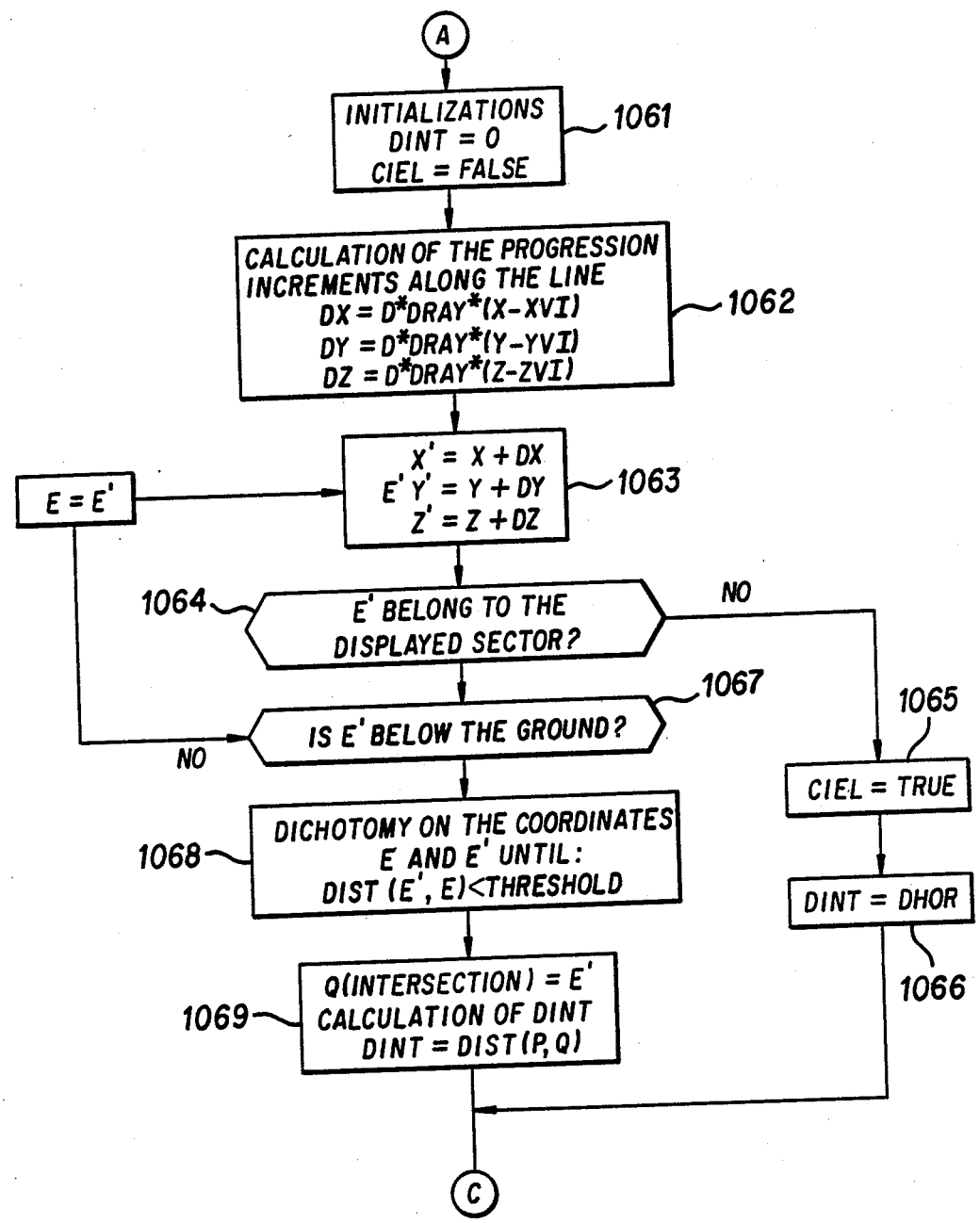
FIG. 8 is a detailed flow chart for performing a subroutine of the method of the invention as shown in FIG. 7.
Figure 9:
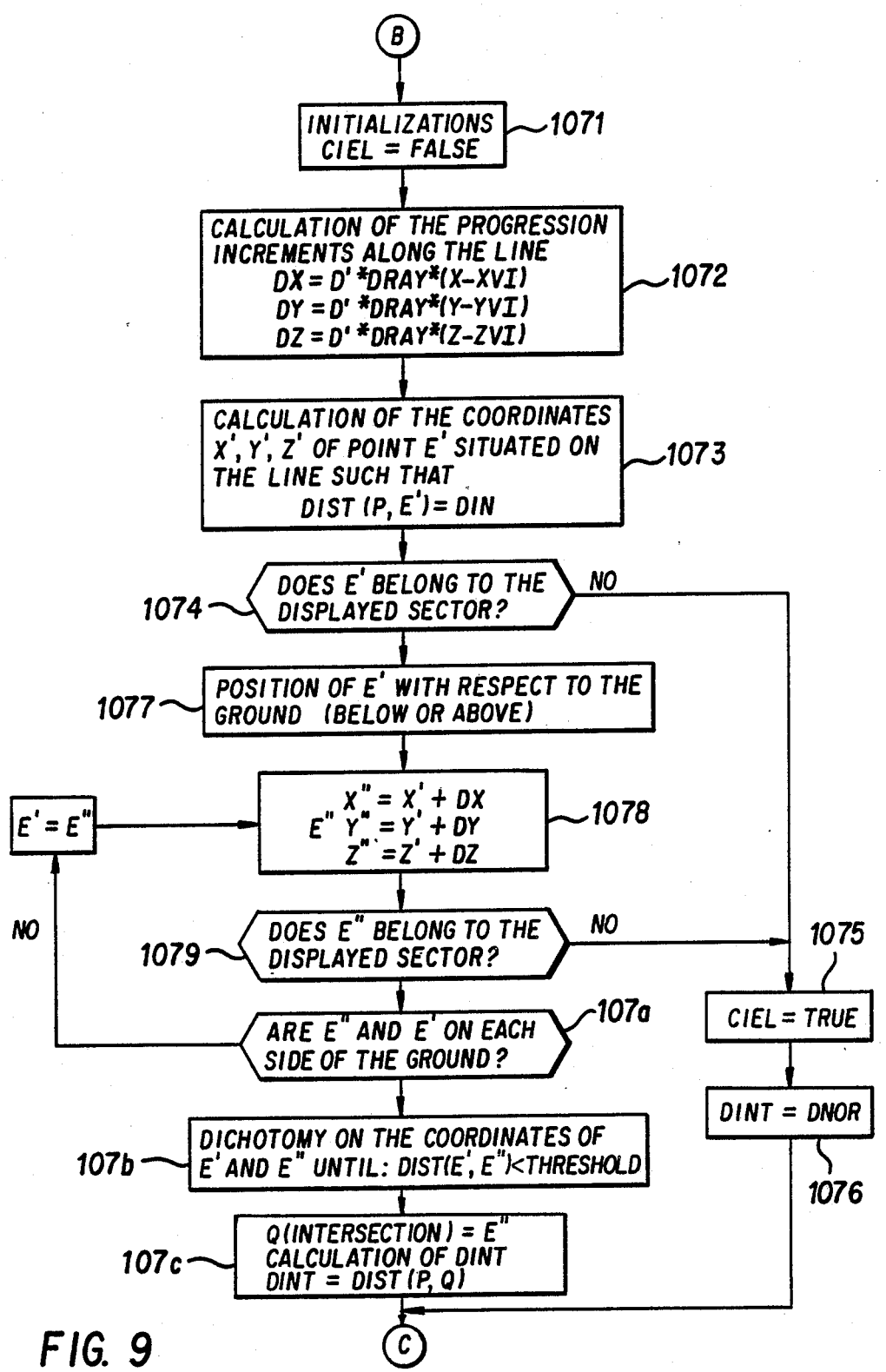
FIG. 9 is a detailed flow chart for performing a subroutine of the method of the invention as shown in FIG. 7.

Block 106 is shown in detail in FIG. 8. In block 1061, the variable DINT represents the distance between point P and the point of intersection Q. In blocks 1061 and 1065, the variable CIEL is "false" if the screen pixel is a pixel 4 of the image of the ground and "true" in the opposite case, where the corresponding pixel is illuminated with the color of the sky.

In block 1062, the variable Dray represents the inverse of the norm of the line segment which passes through the point of intersection P, of coordinates XVI, YVI and ZVI and point E with coordinates X, X, Z. The variable D represents the progression pitch along the radius.

In block 1066, the distance DHOR is the distance beyond which it may be considered that the horizon line has been reached.

Block 107 is shown in detail in FIG. 9 in connection with which remarks may be made similar to those made with respect to block 106.

In block 109 of FIG. 7 the table IPIX represents the table of the screen pixels and the variable NCIEL represents the color chosen for the sky. It will be noted that, when a screen pixel is not an image pixel, the color of the sky is systematically assigned to all the pixels of the column which are disposed above, which saves on computing time without a risk of too great a loss of information. In block 110, table IMA represents the pixels of the digitized map 5.

Naturally the present invention is not limited to the description which has just been made. In particular, it is within the scope of a man skilled in the art to modify certain steps, in a way known per se, so as to reduce the computing time. For example, as long as point E, or point E' are relatively far from the ground 2, it is not obligatory to calculate the altitude of the point of surface 3 which corresponds thereto by bilinear interpolation. Simple rough interpolation may be sufficient, computation of the bilinear interpolation then only being undertaken when point E is fairly close to ground 2.

What is claimed is:

1. A method of representing, on a display device screen (1) and in perspective from a given point (P) of observation, the image of a terrain (2) and a sky, said terrain being known by the coordinates of the nodes (N) of a given mesh network, in which a surface (3) passing through these nodes (N) is determined by interpolation, an assembly of points (Q) on this surface is determined and the pixels (4) of the image to be represented, which are associated with this assembly of points (Q), are illuminated so as to display the image on the display device screen (1), characterized in that a planimetric map (5) or photograph of the terrain (2) is defined with color informations, the map or photograph is digitized so as to obtain map pixels (7,7') of given colors, the points (Q) of said assembly of points being defined so that each point (Q) is associated with a respective pixel (4) of the image, and furthermore, with each of these points (Q), and with each of the corresponding image pixels (4), a map pixel (7') is associated and each image pixel (4) is illuminated in the color of the associated map pixel (7').

2. A method as claimed in claim 1, wherein the pixels of the display device screen (1) which are not pixels (4) of the image of the terrain (2) are illuminated with a color representing the sky.

3. The method as claimed in claim 1, wherein the map pixel associated with a point (Q) of said assembly of points is the map pixel (7') having the same planimetric coordinates as this point (Q).

4. The method as claimed in claim 1, wherein the point of said assembly of points, associated with an image pixel (4) is the first intersection point of said surface (3) with a line extending from the point of observation (P) and which passes through this image pixel (4).

5. The method as claimed in claim 3, wherein, in order to determine said first intersection point (Q):
- a starting step is performed wherein one starts with a point (E; E') situated on said line at an initial distance, of given value, from said display device screen (1),
- a determining step is performed wherein the relative position of said point (E; E') with respect to said surface (3) is determined and if said point (E; E') is above said surface (3), its distance from the display device screen (1) is increased by steps of constant value (D; D') until said point (E; E') is below said surface (3).
- a reducing step is performed wherein said distance is reduced, by steps of a value (D/2, D/4, ..., D/2$^n$; where n is a positive integer) each time equal to half that of the preceding step until said point (E; E') is situated above said surface (3),
- then said distance is increased by steps of a value (D/2$^{n+1}$, D/2$^{n+2}$, ..., D/2$^{n+p}$; where n and p are positive integers) equal each time to half that of the preceding step until said point (E; E') is situated below said surface (3).
- it is so processed until a point (E'; E") is obtained whose distance to the preceding point (E; E') is less than a given threshold (D/2$^n$; where n is a positive integer) and the coordinates of this point (E'; E") are assigned to said first intersection point (Q).

6. The method as claimed in claim 5, wherein the pixels of the display device screen (1) are organized in the form of a matrix having a plurality of lines and a plurality of columns, each column comprising a plurality of pixels, arranged in increasing order from a first pixel having the lowest position in said column to a last pixel having the highest position in said column, and one proceeds for each column, as follows:
- a determining step wherein it is determined whether the first pixel of the column of the display device screen (1) is a pixel (4) of the image of the terrain by searching for a first intersection point (Q) of said surface (3) with a line leaving from the point of observation (P) and passing through this pixel, from an initial distance of zero value between the display device screen (1) and said point (E) situated on said line; and
- an illuminating step wherein if the first pixel is not a pixel (4) of the image of the terrain it is illuminated with a color representing the sky, as well as all the following pixels in the same column,
- the first pixel is a pixel (4) of the image of the terrain it is illuminated in the color of the associated map pixel (7') and the next pixel of the column is taken, for which a first intersection point (Q) is sought, by taking this time as initial distance between the display device screen (1) and said point (E') situated on said line, the distance between the point of observation (P) and the first intersection point (Q) for the preceding pixel.

7. The method as claimed in claim 1, wherein each image pixel (4) is illuminated with the color of the associated map pixel (7') with an intensity varying inversely with the distance between the point of observation (P) and the point (Q) of said assembly of points, associated with this image pixel (4).

8. The method as claimed in claim 1, wherein each pixel (4) is illuminated, in the color of the associated map pixel (7') with an intensity related to the altitude of the point (Q) of said assembly of points, associated with this image pixel (4).

9. The method as claimed in claim 1, wherein, in order to improve the readability of the image a lighting direction of the terrain (2) is defined, and each image pixel (4) is illuminated, in the color of the associated map pixel (7'), with an intensity which depends on the lighting of the surface (3) in the vicinity of the point (Q) of said assembly of points, associated with this image pixel (4).

10. A system for representing, on a display device screen (1) and in perepective from a given point of observation (P), the image of a terrain (2) known by the coordinates of the nodes (N) of a given mesh network, including:
- a first memory (11) for storing the coordinates of said nodes (N),
- means (12) for generating a signal (S) of data representative of the point of observation (P) and of the display device screen (1),
- means (13) connected to said first memory (11) and to said generating means (12) for determining by interpolation a surface (3) passing through said nodes (N), then an assembly of points (Q) on this surface (3), and the pixels (4) of the image to be represented which are associated with this assembly of points (Q), and
- display means (15) connected to said determining means (13) for illuminating said pixels (4) of the image to be represented, in which system:
- a second memory (14) is provided for storing a digitized planimetric map (5), or photograph information, of the terrain (2), with color informations digitized in the form of map pixels (7, 7') of given colors,
- said generating means (13) are connected to said second memory (14) and adapted so as to define the points (Q) of said assembly so that they are all respectively associated with all the pixels (4) of the image, so as to associate with each of all these points, and so with each of the image pixels (4) a map pixel (7) and so as to illuminate each image pixel (4) in the color of the associated map pixel (7).

11. The system as claimed in claim 10, wherein said determining means (13) comprises:
- means (131) connected to said first memory (11) for calculating said surface (3),
- first means (132, 133), connected to said generating means (12) and to said calculating means (131), for associating with an image pixel (4) a first point of intersection (Q) of said surface (3) with a line which starts from the point of observation (P) and passes through this image pixel (4), and
- second means (134) connected to said first means (132, 133) and to the second memory (14) for associating, with each of the intersection points (Q), the map pixel (7) on which the point is to be found having the same planimetric coordinates as this intersection point (Q).

* * * * *